Aug. 30, 1949.  S. H. GAINSLEY  2,480,235
WAGON

Filed Jan. 25, 1946  3 Sheets-Sheet 1

Inventor
SHELDON H. GAINSLEY

By Caswell & Lagaard
Attorneys

Aug. 30, 1949. S. H. GAINSLEY 2,480,235
WAGON
Filed Jan. 25, 1946 3 Sheets-Sheet 2

Inventor
SHELDON H. GAINSLEY
By Caswell & Lagaard
Attorneys

Aug. 30, 1949.　　　　　S. H. GAINSLEY　　　　　2,480,235
WAGON
Filed Jan. 25, 1946　　　　　　　　　　　　　　3 Sheets-Sheet 3
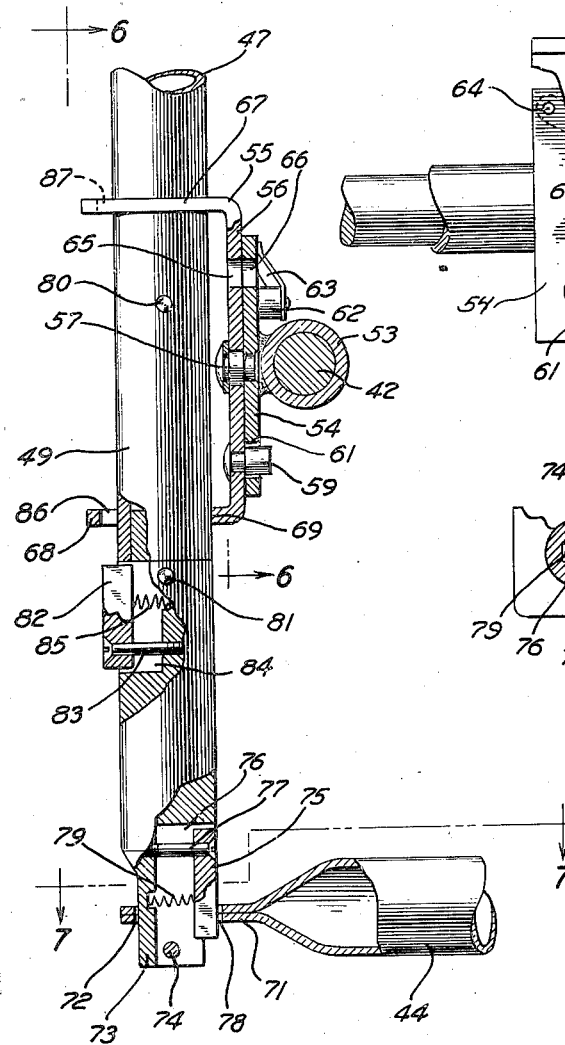
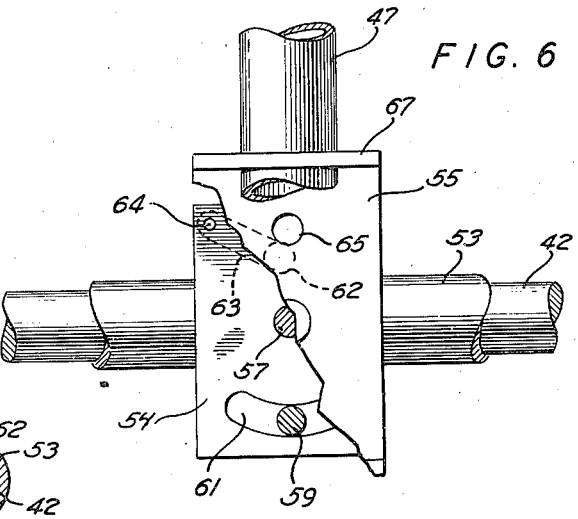
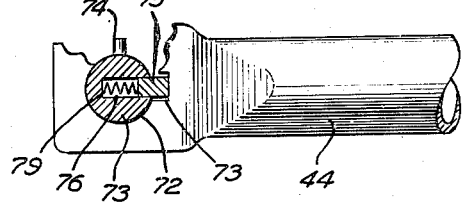
Inventor
SHELDON H. GAINSLEY
By Caswell & Lagaard
Attorneys Patented Aug. 30, 1949

2,480,235

UNITED STATES PATENT OFFICE 2,480,235

WAGON

Sheldon H. Gainsley, Minneapolis, Minn.

Application January 25, 1946, Serial No. 643,359

11 Claims. (Cl. 280—247)

My invention relates to youths' wagons and particularly to the type of wagon adapted to be manually propelled by drawing the same through a steering tongue.

An object of the invention resides in providing propelling means whereby the wagon may be manually propelled through the tongue, while the occupant is seated within the same.

Another object of the invention resides in providing a wagon in which the same is steered by the tongue whether the wagon is propelled by drawing it or operated by the user while seated within the wagon.

A still further object of the invention resides in providing pivot means for guiding the tongue for swinging movement about transverse and longitudinal horizontal axes and providing means for operating a driving wheel of the wagon when the tongue is moved in a longitudinal direction and in providing other means for steering the wagon when the tongue is moved in its transverse direction.

Another object of the invention resides in providing a steering mechanism for the wagon including a transversely movable member and in pivotally connecting the tongue to said member.

A feature of the invention resides in providing a longitudinally movable rod for driving the driving wheel of the wagon and in further providing pivot means between said tongue and rod for operating the same.

Another object of the invention resides in constructing the device so that the pivot means for the steering mechanism forms a reaction to permit of operating the tongue to propel the vehicle and so that the pivot means between the tongue and rod forms a reaction for swinging said tongue to operate the steering mechanism.

A further object of the invention resides in providing means for detachably connecting the tongue to the propelling means whereby the tongue may be swung into a position to permit of manually drawing the wagon.

Other objects of the invention reside in the novel combination and arrangement of parts and in the details of construction hereinafter illustrated and/or described.

In the drawings:

Fig. 5 is an elevational sectional view of a portion of the steering mechanism of the invention taken substantially on line 5—5 of Fig. 1 and drawn to a greater scale.

Fig. 6 is an elevational sectional view taken on line 6—6 of Fig. 5.

Fig. 7 is a plan sectional view taken on line 7—7 of Fig. 5.

Figure 1:
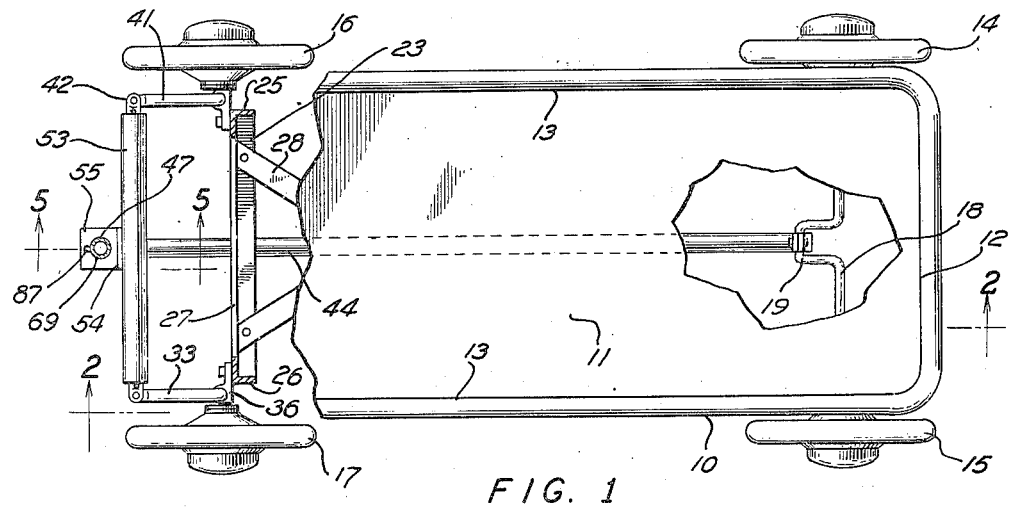
Fig. 1 is a plan view of a wagon illustrating an embodiment of my invention and showing portions thereof broken away to illustrate the construction of the same.

In the use of small youths' wagons, it becomes desirable for the youth to be able to propel and steer the wagon when seated within the same and to propel the wagon manually by drawing the same when the wagon is used for hauling and similar purposes. The instant invention provides a construction whereby both of these functions may be accomplished.

My improved wagon includes a body 10 in the form of a box having a bottom 11, end walls 12 and side walls 13. This body is supported upon two rear wheels 14 and 15 and upon two front wheels 16 and 17.

The two rear wheels 14 and 15 are mounted on a transverse axle 18 which is formed intermediate its ends with a crank 19. The said axle is journaled in bearings 21 formed in two brackets 22 secured to the under side of the bottom 11 of body 10. One of the rear wheels is attached to the axle 18, while the other is loosely rotatable thereon. For the purpose of illustration, the wheel 14 has been assumed to be the driving wheel and is keyed to or fixed relative to the axle 18. Suitable collars not shown with reference to the wheel 15 hold the said wheel rotatably mounted on the opposite end of the axle. Such construction being well known in the art, has not been illustrated in detail in the drawings.

The two front wheels 16 and 17 form the steering wheels of the invention and are supported in the following manner: Extending transversely of the body 10 and attached to the under side of the bottom 11 thereof is a transverse frame member 23. This frame member has a horizontal portion 24 which may be riveted, welded or otherwise secured to the bottom 11 of body 10 and two legs 25 and 26 depending therefrom. A tie bar 27 connects the lower ends of these legs together. The various portions of the frame 23 may be constructed of angle material welded together or from a sheet of material from which flanges have been struck out. The tie-bar 27 is connected by means of a brace 28 with the bottom 11 of body 10 rearwardly of the frame member 23.

The body 10, the transverse frame member and the brackets 22 form a frame structure for the wagon which rotatably carries the various wheels 14, 15, 16 and 17. It can readily be comprehended that a separate frame structure may be employed and the body 10 supported thereon.

Figure 3:
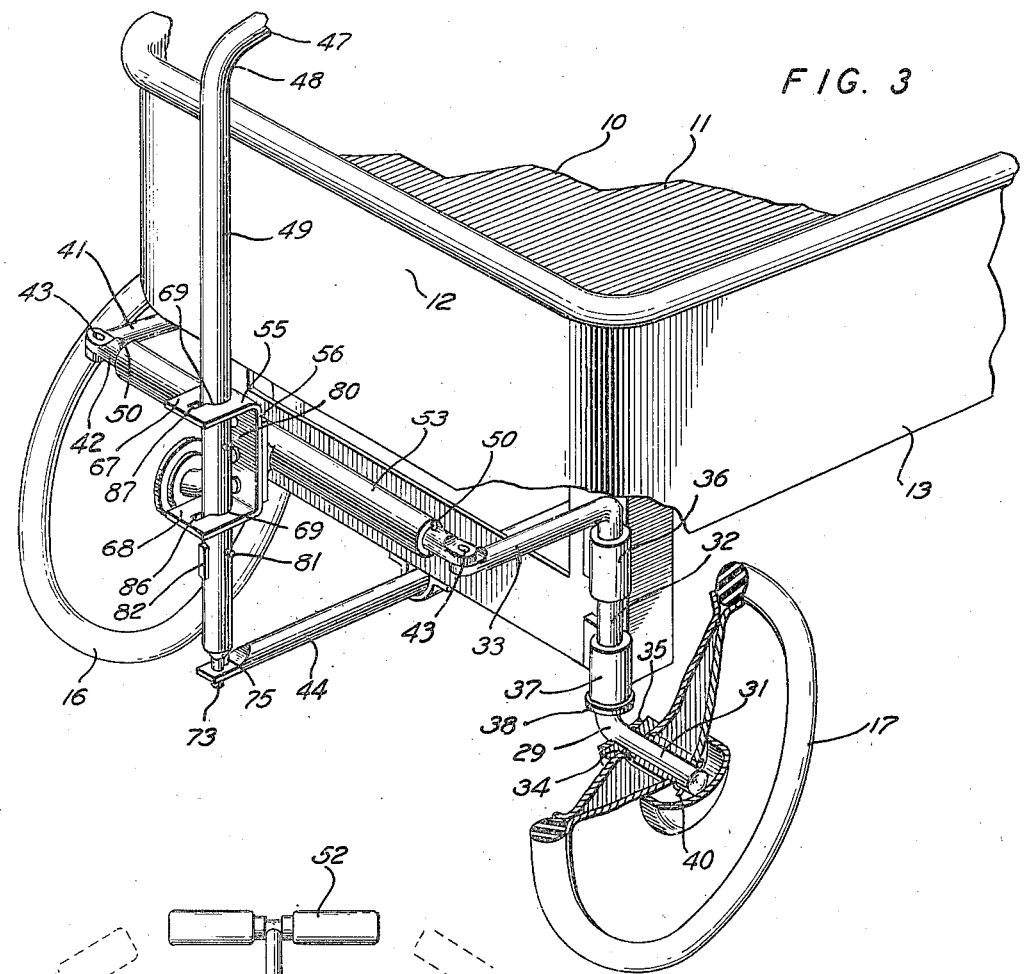
Fig. 3 is a perspective view of the forward portion of the wagon.

The two wheels 16 and 17 are similarly constructed and supported for steering movement in substantially the same manner. For this reason, the supporting structure associated with only the wheel 17 will be described in detail. For supporting the wheel 17, a supporting member 29 is employed, best shown in Fig. 3, which is constructed of round rod bent to form a stub axle 31, a spindle 32 extending vertically upwardly therefrom and an arm 33 extending horizontally and forwardly from the spindle 32. The wheel 17 has a bearing 34 formed thereon which is rotatably mounted on the stub axle 31. A collar 35 on said stub axle and a pin 40 hold the said wheel in position thereon. The spindle 32 is rotatably supported in two radial bearings 36 and 37 which are attached to the leg 26 of the frame member 23 by bolts, welding or otherwise. A thrust bearing 38 takes the load formed by the wagon proper and transmits it to the wheel 17. The supporting member for the wheel 16 is designated by the reference numeral 39 and has an arm 41 extending forwardly therefrom and corresponding to the arm 33.

Extending across the two arms 33 and 41 is a link 42 which is pivoted at its ends to the ends of said arms by means of pintles 43. This link is constructed of round stock, as illustrated. By means of the link 42, the two arms 33 and 41 are caused to swing in unison when the said link is moved transversely, thus causing steering of the wagon in a well-known manner.

For propelling the wagon, a connecting rod 44 is employed which may be constructed of tubular stock and which is formed at one end with a bearing 45 journaled on the crank 19. The said connecting rod is guided for sliding and swinging movement in a guide 46 which is secured to the under side of the tie bar 27 of the transverse frame member 23. The fit between the rod 44 and the guide 46 is loose enough to accommodate the movement of the crank 19. The rod 44 moves longitudinally and upon being reciprocated, operates to drive the wheel 14. The connecting rod 44 and the crank 19, together with the associated parts, form the driving mechanism for the wagon.

For use in manipulating the wagon, a tongue 47 is employed which is constructed from a round rod or tube and formed intermediate its ends with a bend 48. This provides an upright portion 49 and a handle portion 51. Attached to the handle portion 51 is a transverse handle 52 by means of which the tongue may be moved. This tongue is supported solely by the steering mechanism and propelling mechanism of the invention.

The steering mechanism of the invention includes the link 42. This link has rotatably mounted on it a tubular member 53 which is held from longitudinal movement on said link by means of pins 50 extending therethrough. Said tubular member has welded to the same forwardly thereof and substantially midway of the ends thereof a vertically extending plate 54. Mounted on this plate is a clevis 55 best shown in Fig. 5 which has a back 56 overlying the plate 54. A stud 57 extending outwardly from the plate 54 forms a pivot for the clevis 55. On this stud is mounted a washer 58 which holds the said back in place upon the plate. The clevis 55 is adapted to swing through an arc of a circle limited by means of a pin 59 secured to the back 56 and operating in an arcuate slot 61 in the plate 54. The clevis 55 may be held locked in position with reference to the plate 54 by means of a latch lug 62. This lug is mounted on a leaf spring 63 which is secured to the plate 54 on the rearward side thereof by means of a rivet 64. The said lug may be swung into the position shown in Fig. 5 or to a position where the same is received in two registering holes 65 and 66 formed in the back 56 and plate 54, respectively. The clevis 55 is constructed from sheet metal and is formed with two arms 67 and 68 bent outwardly therefrom. These arms have holes 69 extending through the same and through which the upright portion 49 of tongue 47 extends. These arms form guides for slidably supporting the tongue relative to the steering link 42 of the invention.

The connecting rod 44 is preferably formed tubular and has a flattened portion 71 at its foremost end which is provided with a vertically extending opening 72 in the same. A stud 73, secured to the end of the portion 49 of tongue 47, is reduced in diameter at its lower end and is adapted to be received in the opening 72 in the connecting rod 44. This stud has a pin 74 extending outwardly therefrom which engages the flattened portion 71 of connecting rod 44 and prevents the disconnection of the tongue 47 from said connecting rod when the said tongue is in the position shown in Fig. 5. A key 75 slidably mounted in a slot 76 in the end of the stud 73 and mounted on a bolt 77 is adapted to engage a keyway 78 formed in the flattened portion 71 of connecting rod 44. This key is urged into said keyway by means of a compression coil spring 79 and may be moved manually out of engagement therewith. When it becomes desirable to disengage the tongue 47 from the connecting rod 44, key 75 is pressed inwardly, permitting of rotation of the tongue about the axis of the hole 72. When the pin 74 comes opposite the key way 78, the upright portion 49 of the tongue may be raised, the said pin passing through the key way 78 and the said tongue sliding along the holes 69 formed in the arms 67 and 68 of clevis 55.

The sliding movement of the upright portion 49 of tongue 47 within the clevis 55 is restrained by means of pins 80 and 81 extending outwardly from the same. In close proximity to the pin 81 is provided a key 82 similar to the key 75 and which is disposed within a slot 84 in the stud 73. The said key slides on a bolt 83 secured to the said stud. A compression coil spring 85 urges the key 82 outwardly. The pins 80 and 81 are adapted to pass through notches 86 and 87 in the arms 68 and 69 of clevis 55, when the tongue 47 is being disconnected from the clevis 55. Likewise, the key 82 slides through the notches 86 and 87 in arms 68 and 67 when the tongue is being disconnected or assembled.

Figure 2:
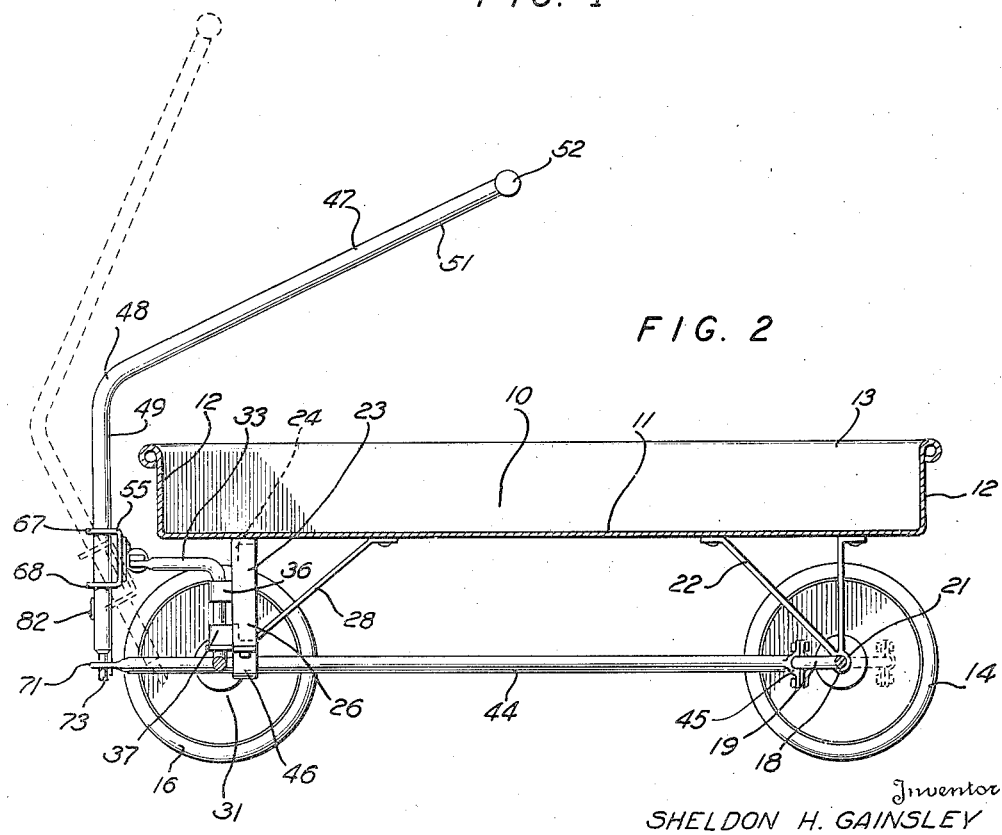
Fig. 2 is a longitudinal elevational sectional view taken on line 2—2 of Fig. 1.
Figure 4:
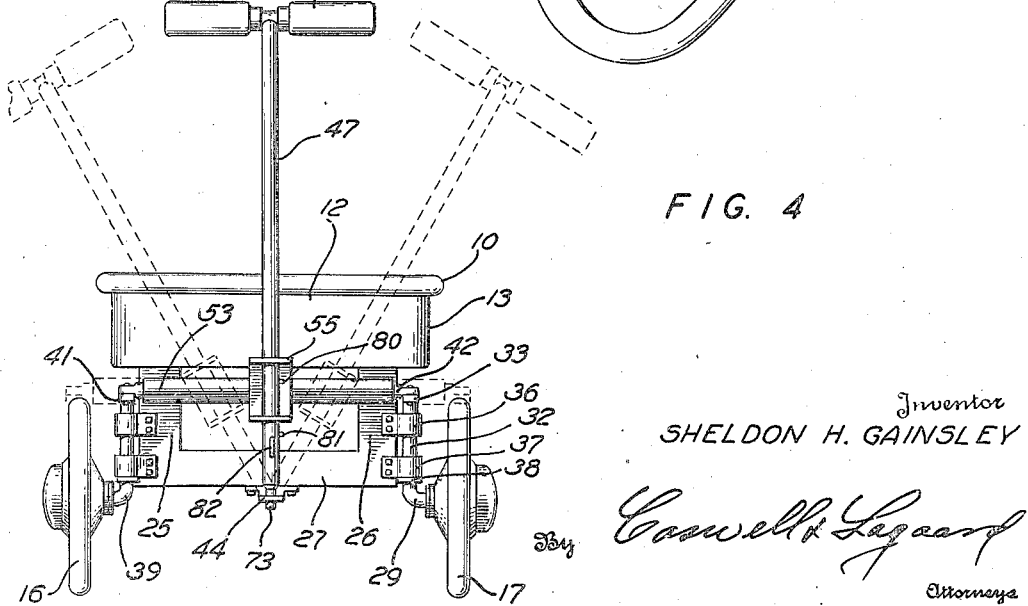
Fig. 4 is a front elevational view of the wagon shown in Fig. 1.

The operation of the invention is as follows: When the parts are as shown in Figs. 1, 2, 3, 4, 5, 6 and 7, the tongue is disposed as illustrated in Fig. 2 and the handle 52 is within reach of the operator seated in the body 10. Upon moving the handle 52 back and forth and swinging the tongue 47 about a transverse horizontal axis coincidental with the axes of the tube 53 and link 42, the rod 44 is reciprocated and the crank 19 operated to rotate axle 18 and drive wheel 14, This will propel the wagon while the operator is seated within the same. Lateral movement of the tongue 47 from the full-line position to either of the two dotted-line positions, as shown in Fig. 4, will cause the said tongue to swing about a longitudinal horizontal axis substantially coincidental with the axis of the rod 44. Such swinging movement of the tongue 44 causes the tube 53 to move the link 42 transversely and to swing the arms 33 and 41 and steer the wagon by means of the wheels 16 and 17. It will readily be comprehended that the wagon may be propelled when the handle is in any of its various positions as indicated in Fig. 4 or when in any intermediate position. This permits of both steering and propelling the vehicle with the same device and without interfering with the operation of either the steering mechanism or the propelling mechanism. When it becomes desirable to propel the wagon by drawing the same, tongue 47 is disconnected from the propelling mechanism. This is accomplished by pressing the key 75 inwardly. Tongue 47 may now be rotated to bring the pin 74 in register with the key way 78. Upon exerting upward movement on the tongue, the same will readily become disengaged from rod 44. Pressure on the key 82 will, in a similar manner, permit of passing the pin 81 through the notch 86. By releasing key 82 and rotating tongue 47 to its normal position, key 82 enters notch 86 and locks the tongue for rotation. The tongue 47 is now rigidly held attached to clevis 55 and the wagon may be propelled by drawing the same through the tongue in the customary manner.

The advantages of my invention are manifest. The device is extremely useful in that it permits the ordinary youths' wagon to be used for hauling and similar purposes and propelled by drawing the same by the steering tongue in the customary manner. By connecting the tongue with the connecting rod, the youth may sit in the wagon and simultaneously propel and steer the same by manipulation of the tongue. A wagon constructed in accordance with my invention may be built at a reasonable cost. The device is simple to operate and change from one function to the other may be accomplished with a minimum amount of effort. There are no loose or removable parts with the invention, so that when connecting or disconnecting the tongue from the connecting rod, no parts can become lost or injured. Propulsion of the vehicle by means of my improved invention is extremely effective and requires a minimum amount of effort. By means of the construction used, the connecting rod forms the reaction when moving the tongue for steering purposes and the steering mechanism forms the reaction for moving the tongue for propelling purposes. Thus, no direct attachment of the tongue to the body or the frame structure is required.

Changes in the specific form of my invention, as herein described, may be made within the scope of what is claimed without departing from the spirit of my invention.

Having described my invention, what I claim as new and desire to protect by Letters Patent is:

1. In a wagon, a frame structure, a front steering wheel and a rear driving wheel rotatably mounted relative thereto, a tongue disposed at the forward portion of said frame structure, a rod connected to said driving wheel and extending longitudinally of the frame structure, pivot means between said tongue and rod, and having an axis extending transversely of the frame structure, a steering member connected to said steering wheel, pivot means between said member and tongue and having an axis extending longitudinally of said frame structure, said tongue, upon lateral movement, moving said steering member and upon longitudinal movement, moving said rod, means carried by said frame structure and restraining lateral movement of said rod, to form a reaction between said rod and tongue whereby lateral movement of said tongue causes steering movement of said steering wheel.

2. In a wagon, a frame structure, a pair of steering wheels disposed at one end of said frame structure and a driving wheel at the other end thereof, a tongue disposed at the end of said structure adjacent said steering wheels, a supporting member for each of said steering wheels carried by said frame structure and pivoted for swinging movement about a vertical axis, an arm extending forwardly from each of said supporting structures, a link pivotally connected to said arms and movable in a transverse direction, pivot means between said link and tongue and accommodating swinging movement of said tongue about transverse and longitudinal horizontal axes, a rod connected to said driving wheel and extending longitudinally of said frame structure and movable in a longitudinal direction, means for restraining transverse movement of said rod, pivot means between said rod and said tongue and accommodating movement of said tongue about transverse and longitudinal axes with reference to said rod, said tongue, upon movement in a longitudinal direction, moving said rod to drive said driving wheel and said tongue when movable laterally shifting said link to steer said steering wheel.

3. In a wagon, a frame structure, a front steering wheel and a rear driving wheel rotatably mounted relative thereto, a tongue disposed at the forward portion of said frame structure, a supporting member for said steering wheel carried by said frame structure and pivoted relative thereto about a vertical axis, a link connected to said supporting member and tongue and movable transversely of said frame structure, pivot means between said link and tongue and accommodating swinging movement of said tongue about transverse and longitudinal horizontal axes, a rod connected to said driving wheel and extending longitudinally of said frame structure and movable in a longitudinal direction, pivot means between said rod and said tongue and accommodating movement of said tongue about transverse and longitudinal axes with reference to said rod, said tongue, upon movement in a longitudinal direction, moving said rod to drive said driving wheel and said tongue when movable laterally shifting said link to steer the steering wheel, means for disconnecting said tongue from said rod, said tongue when connected to said rod extending generally rearwardly to propel the vehicle and when disconnected therefrom being adapted to extend forwardly to permit of drawing the vehicle by hand.

4. In a wagon, a frame structure, a pair of steering wheels disposed at one end of said frame structure and a driving wheel at the other end thereof, a tongue disposed at the end of said frame structure adjacent said steering wheels, a supporting member for each of said steering wheels carried by said frame structure and pivoted for swinging movement about a vertical axis, an arm extending forwardly from each of said supporting structures, a link pivotally connected to said arms and movable in a transverse direction, pivot means including a bearing rotatable relative to said link and about the axis thereof, a second bearing pivoted to said first named bearing about a substantially longitudinal axis, guides formed on said bearing and slidably receiving said tongue and guiding the same for substantially vertical movement, a rod connected to said driving wheel and extending longitudinally of said frame structure and movable in a longitudinal direction and pivot means between said tongue and rod and accommodating longitudinal movement of said rod and transverse movement of said link.

5. In a wagon, a frame structure, a pair of steering wheels disposed at one end of said frame structure and a driving wheel at the other end thereof, a tongue disposed at the end of the frame structure adjacent said steering wheels, a supporting member for each of said steering wheels carried by said frame structure and pivoted for swinging movement about a vertical axis, an arm extending forwardly from each of said supporting structures, a link pivotally connected to said arms and movable in a transverse direction, pivot means including a bearing rotatable relative to said link and about the axis thereof, a second bearing pivoted to said first named bearing about a substantially longitudinal axis, guides formed on said bearing and slidably receiving said tongue and guiding the same for substantially vertical movement, a rod connected to said driving wheel and extending longitudinally of said frame structure and movable in a longitudinal direction, pivot means between said tongue and rod and accommodating longitudinal movement of said rod and transverse movement of said connecting link, means for detachably securing the tongue to said rod at said pivot means, said tongue, when disengaged from said rod, being adapted to slide vertically in said guides and to become freed from said rod, said tongue in its freed position, permitting of drawing the wagon manually and serving to swing said link to steer the steering wheel.

6. In a wagon, a frame structure, a pair of steering wheels disposed at one end of said frame structure and a driving wheel at the other end thereof, a tongue disposed at the portion of said frame structure adjacent said steering wheels, a supporting member for each of said steering wheels carried by said frame structure and pivoted for swinging movement about a vertical axis, an arm extending forwardly from each of said supporting structures, a link pivotally connected to said arms and movable in a transverse direction, pivot means including a bearing rotatable relative to said link and about the axis thereof, a second bearing pivoted to said first named bearing about a substantially longitudinal axis, guides formed on said bearing and slidably receiving said tongue and guiding the same for substantially vertical movement, a rod connected to said driving wheel and extending longitudinally of said frame structure and movable in a longitudinal direction, a vertically extending opening formed in said rod, a stud formed on the end of said tongue and loosely fitting within said opening to accommodate lateral and transverse swinging of said tongue with reference to said rod, said stud being disengaged from said opening upon sliding movement of the tongue upwardly along said guides and a key for retaining said stud in position within said opening.

7. In a wagon, a frame structure, a pair of steering wheels disposed at one end of said frame structure and a driving wheel at the other end thereof, a tongue disposed at the portion of said frame structure adjacent said steering wheels, means for steering said steering wheels including a transversely movable link, a rod connected to said driving wheel and extending longitudinally of said frame structure and movable in a longitudinal direction, means for restraining lateral movement of said rod, pivot means acting between the forward end of said rod and the lower end of said tongue, pivot means acting between said link and said tongue and engaging said tongue at a locality above said rod, said rod forming a fulcrum for accommodating lateral movement of said tongue to move said link laterally for the purpose of steering the wagon, said link forming a fulcrum for accommodating longitudinal movement of said tongue to move said rod longitudinally for the purpose of propelling the vehicle.

8. In a wagon, a frame structure, a pair of steering wheels disposed at one end of said frame structure and a driving wheel at the other end thereof, a tongue disposed at the portion of said frame structure adjacent said steering wheels, means for steering said steering wheels including a transversely movable link, pivot means between said tongue and link having a transverse horizontal axis and accommodating swinging from a forward position in which the wagon may be manually drawn by the tongue and to a rearward position a rearwardly extending connecting rod pivoted to said tongue and power transmission means between said tongue and said driving wheel for procuring propulsion of the wagon upon rearward movement of the tongue when the tongue is in its latter position.

9. In a wagon, a frame structure, a pair of steering wheels disposed at one end of said frame structure and a driving wheel at the other end thereof, a tongue disposed at the portion of said frame structure adjacent said steering wheels, a supporting member for each of said steering wheels carried by said frame structure and pivoted for swinging movement about a vertical axis, an arm extending forwardly from each of said supporting structures, a link pivotally connected to said arms and movable in a transverse direction, said link being disposed forwardly of the axis of said steering wheels and outwardly and forwardly of the frame of the wagon, pivot means between said tongue and link having a transverse horizontal axis and accommodating swinging from a forward position in which the wagon may be manually drawn by the tongue and to a rearward position a rearwardly extending connecting rod pivoted to said tongue and power transmission means between said tongue and said driving wheel for procuring propulsion of the wagon upon rearward movement of the tongue when the tongue is in its latter position.

10. In a wagon, a frame structure, a front steering wheel and a rear driving wheel rotatably mounted relative thereto, a tongue disposed at the forward portion of said frame structure, a supporting member for said steering wheel carried by said frame structure and pivoted relative thereto about a vertical axis, a link connected to said supporting member and movable transversely of said frame structure, pivot means between said link and tongue and accommodating swinging movement of said tongue about transverse and longitudinal horizontal axis, a rearwardly extending connecting rod pivoted to said tongue, power transmission means connected to the driving wheel and connecting rod and operable upon longitudinal movement of the tongue, pivot means for detachably connecting the tongue at a locality spaced from the first named pivot means to a part restrained from lateral movement, said tongue upon movement transversely about said second named pivot means serving to shift said link laterally and to steer the wagon, said tongue upon detachment from said pivot means being movable to a position in which the wagon may be drawn manually by the tongue and locking means acting between said tongue and link and restraining movement of said tongue about its longitudinal axis when the tongue is detached from its second named pivot means.

11. In a wagon, a frame structure, a steering wheel disposed at one end of the frame structure and driving wheels at the other end thereof, a body on said frame structure, an axle for said steering wheel, a spindle having a vertical axis and guiding said axle for steering movement, an arm connected to said axle and serving to swing said steering wheel about the axis of said spindle, a link connected to said arm and disposed in a horizontal transverse position and situated forwardly of said body, a tongue pivoted to said link for swinging movement about a transverse horizontal axis, a connecting rod reciprocable longitudinally of said frame power transmission means connected to said connecting rod and driving wheels, means for restraining lateral movement of said connecting rod and a detachable connection between said tongue and connecting rod serving to hold the tongue in a position rearwardly of the steering wheel to enable the occupant to propel and steer the wagon, said tongue when disconnected from said connecting rod swinging forwardly about said link to bring the tongue into a position in which the wagon may be manually drawn by the tongue.

SHELDON H. GAINSLEY.

REFERENCES CITED

The following references are of record in the file of this patent:

UNITED STATES PATENTS

| Number | Name | Date |
| --- | --- | --- |
| 1,536,788 | Grady | May 5, 1925 |
| 1,787,322 | Pugh | Dec. 30, 1930 |